United States Patent
Moore et al.

(10) Patent No.: US 7,213,142 B2
(45) Date of Patent: May 1, 2007

(54) SYSTEM AND METHOD TO INITIALIZE REGISTERS WITH AN EEPROM STORED BOOT SEQUENCE

(75) Inventors: Wayne A. Moore, Hillsboro, OR (US); Paul A. Kayfes, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 560 days.

(21) Appl. No.: 10/421,287

(22) Filed: Apr. 22, 2003

(65) Prior Publication Data

US 2004/0215836 A1    Oct. 28, 2004

(51) Int. Cl.
*G06F 9/24* (2006.01)
*G06F 15/17* (2006.01)
*G06F 3/00* (2006.01)

(52) U.S. Cl. ............... 713/100; 713/1; 713/2; 710/8; 710/10

(58) Field of Classification Search ..................... None
See application file for complete search history.

(56) References Cited

U.S. PATENT DOCUMENTS

| | | | | |
|---|---|---|---|---|
| 6,614,483 B1* | 9/2003 | Lee et al. | ................. | 348/391.1 |
| 6,640,262 B1* | 10/2003 | Uppunda et al. | ............. | 710/10 |
| 6,678,728 B1* | 1/2004 | Uppunda et al. | ........... | 709/222 |
| 6,934,345 B2* | 8/2005 | Chu et al. | ................... | 375/346 |
| 2002/0108032 A1* | 8/2002 | Su et al. | ........................ | 713/1 |

* cited by examiner

*Primary Examiner*—James K. Trujillo
(74) *Attorney, Agent, or Firm*—Blakely, Sokoloff, Taylor & Zafman LLP

(57) ABSTRACT

A system and method to initialize registers with an EEPROM stored boot sequence is described. The method includes reading configuration records from an EEPROM coupled to an ASIC upon system reset. The configuration records specify target configuration registers and data to be written to the registers. The configuration records are translated to register write requests and data is written to the target registers via a bus of the ASIC to initialize the registers. Other masters, such as a processor, may be blocked from accessing the registers during the initialization.

20 Claims, 3 Drawing Sheets

SYSTEM AND METHOD TO INITIALIZE REGISTERS WITH AN EEPROM STORED BOOT SEQUENCE

BACKGROUND

1. Technical Field

Embodiments of the invention relate to the field of initialization of ASICs, and more specifically to initializing registers with an EEPROM stored boot sequence.

2. Background Information and Description of Related Art

Complex Application Specific Integrated Circuits (ASICs) have a large number of configuration registers. These registers perform a variety of functions, such as device identification, feature enumeration, configuration of device operation, or communication of interrupts. Following system reset, there must be a process to initialize these registers.

One way to initialize these registers is to come up in a default state after power up and use software to program the ASIC. Another way is to use hardware to initialize the ASIC. However, current hardware solutions are inflexible, since the hardware stores dedicated information in fixed locations that only allow the hardware to initialize a limited number of predefined registers.

BRIEF DESCRIPTION OF DRAWINGS

The invention may best be understood by referring to the following description and accompanying drawings that are used to illustrate embodiments of the invention. In the drawings.

DETAILED DESCRIPTION

Embodiments of a system and method to initialize registers with an EEPROM stored boot sequence are described. In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
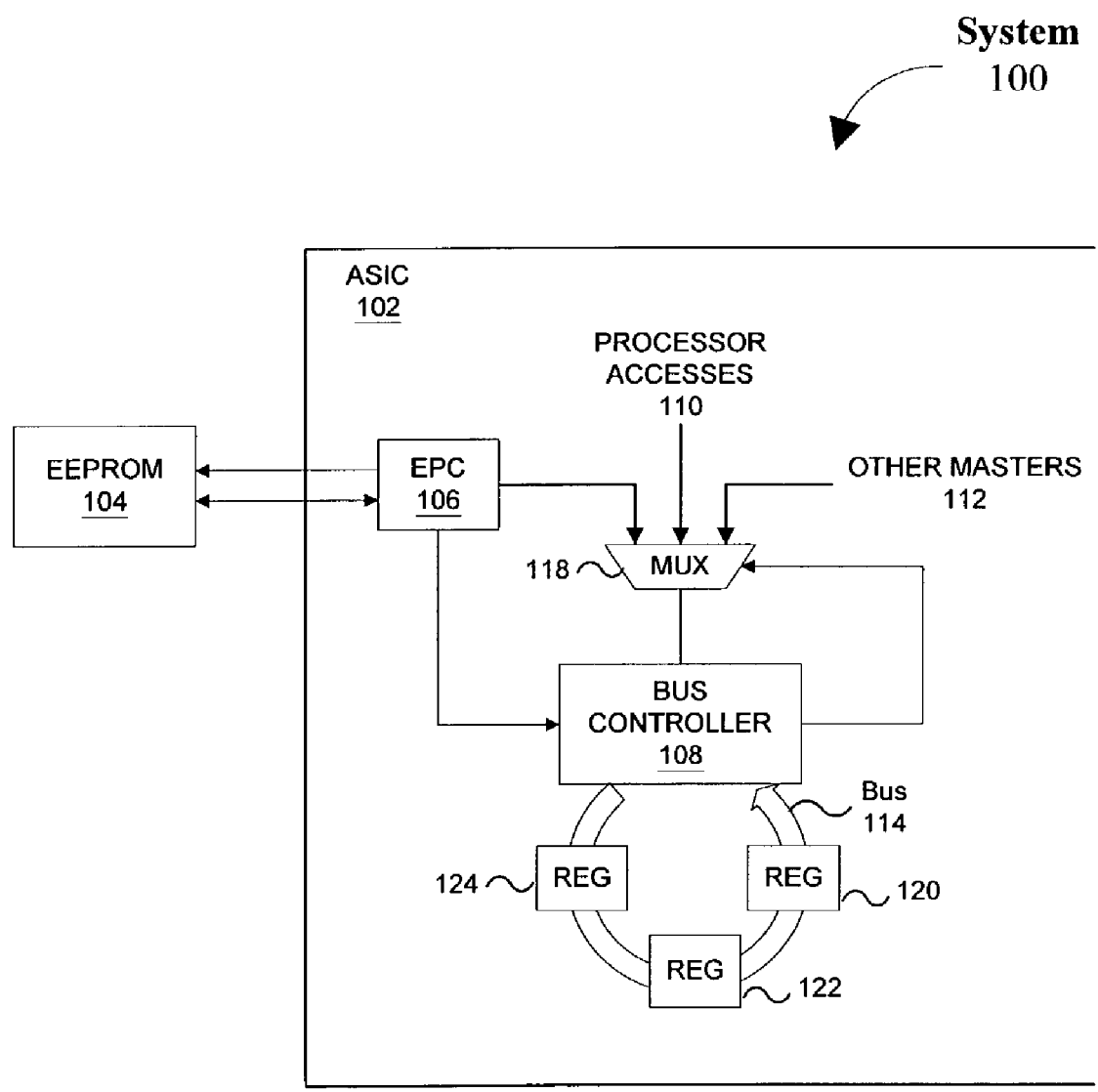
FIG. 1 is a block diagram illustrating one generalized embodiment of a system incorporating the invention.

Referring to FIG. 1, a block diagram illustrates a system 100 according to one embodiment of the invention. Those of ordinary skill in the art will appreciate that the system 100 may include more components than those shown in FIG. 1. However, it is not necessary that all of these generally conventional components be shown in order to disclose an illustrative embodiment for practicing the invention.

System 100 includes an electrically erasable programmable read-only memory (EEPROM) 104 coupled to an application specific integrated circuit (ASIC) 102. The ASIC 102 includes an EEPROM controller 106 and a bus controller 108. The bus controller 108 controls the activity on bus 114. Upon system reset, the EEPROM controller 106 reads the configuration records of the EEPROM 104. The configuration records are processed to determine which registers are to be initialized with the specified data. The configuration records are translated to write requests. The target registers, such as 120, 122, or 124, are accessed via the bus 114 and the specified data is written to the registers. In this way, any register in the ASIC may be initialized via the configuration records of the EEPROM. In one embodiment, register accesses by a processor 110 and other masters 112 are prevented during the initialization of the registers. This may be done by a multiplexor (MUX), such as 118, controlled by the bus controller 108.

The following is an example of a configuration record format according to one embodiment of the invention.

| Command | Space | Length |
|---|---|---|
| | Address 1 | Address 0 |
| | Address 2 | Address 2 |
| | Data Byte 1 | Data Byte 0 |
| | Data Byte 3 | Data Byte 2 |

After system reset, the configuration records are read. The command field in the configuration record indicates the next action to be taken. For example, an end command may be used to indicate that no further configuration records are to be processed. A jump command may be used to indicate that the next configuration record to be processed is at a specified address. A write command may be used to indicate that the specified data is to be written to specified target registers. The target registers are specified by the address space and address fields, and the data to be written to the target registers is specified by the data fields. The length field specifies the length of the data, such as the number of bytes, to be written to the specified register address.

Figure 2:
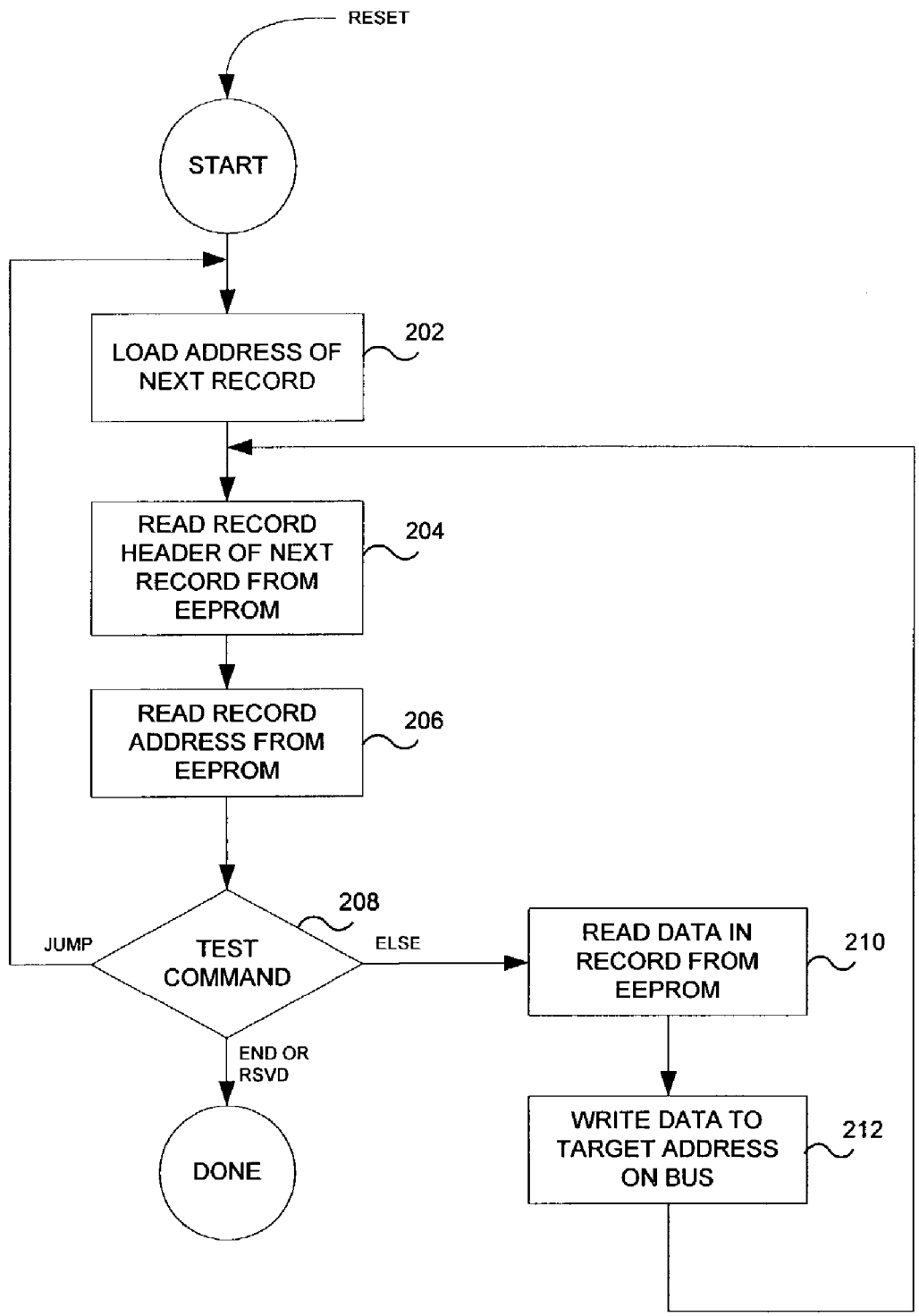
FIG. 2 is a flow diagram illustrating a method according to an embodiment of the invention.

FIG. 2 illustrates a process of register initialization upon system reset according to one embodiment of the invention. Upon system reset, the process starts at 202, where the address of the first configuration record is loaded. Then, at 204, the record header is read. The record header contains information such as the command, the address space, and the length. At 206, the address field of the record is read. At 208, the command field is checked to determine what action to take next. For example, if the command is an end or reserved/undefined command, the process is finished and no further configuration records are processed. If the command is a jump, then a new record is read from the specified address in the address field, and the process starts again from 202. If the command is a write, then at 210, the data in the record is read. At 212, the data is written to the specified address space and address via the bus. In one embodiment, data is read from the record and written to the target address until the specified length has been satisfied. In one embodiment, if the command is a sequential write, the target address may be incremented after each write to the bus. After the configuration record is finished processing, the next configuration record is read from the next sequential EEPROM address, and the process is repeated from 204.

In one embodiment, other masters, such as the processor, may be blocked from accessing the registers until the configuration records are finished processed. This may be done using a MUX controlled by the bus controller.

In one embodiment, some configuration registers may be read-only to masters, such as the processor, but may be written to by the EEPROM controller during initialization. This may be implemented by having writes initiated by the EEPROM controller contain a different value in the write requests than writes initiated by other masters, such as the processor. For example, writes initiated by the EEPROM controller may have a "01" in the two least significant address bits, while writes from the other masters have a "00" in the two least significant address bits. In this way, write requests from the EEPROM controller and write requests from other masters may be differentiated. The EEPROM controller may then be allowed to have read/write access to the registers during initialization upon system reset, while other masters have read only access to the same registers.

Figure 3:
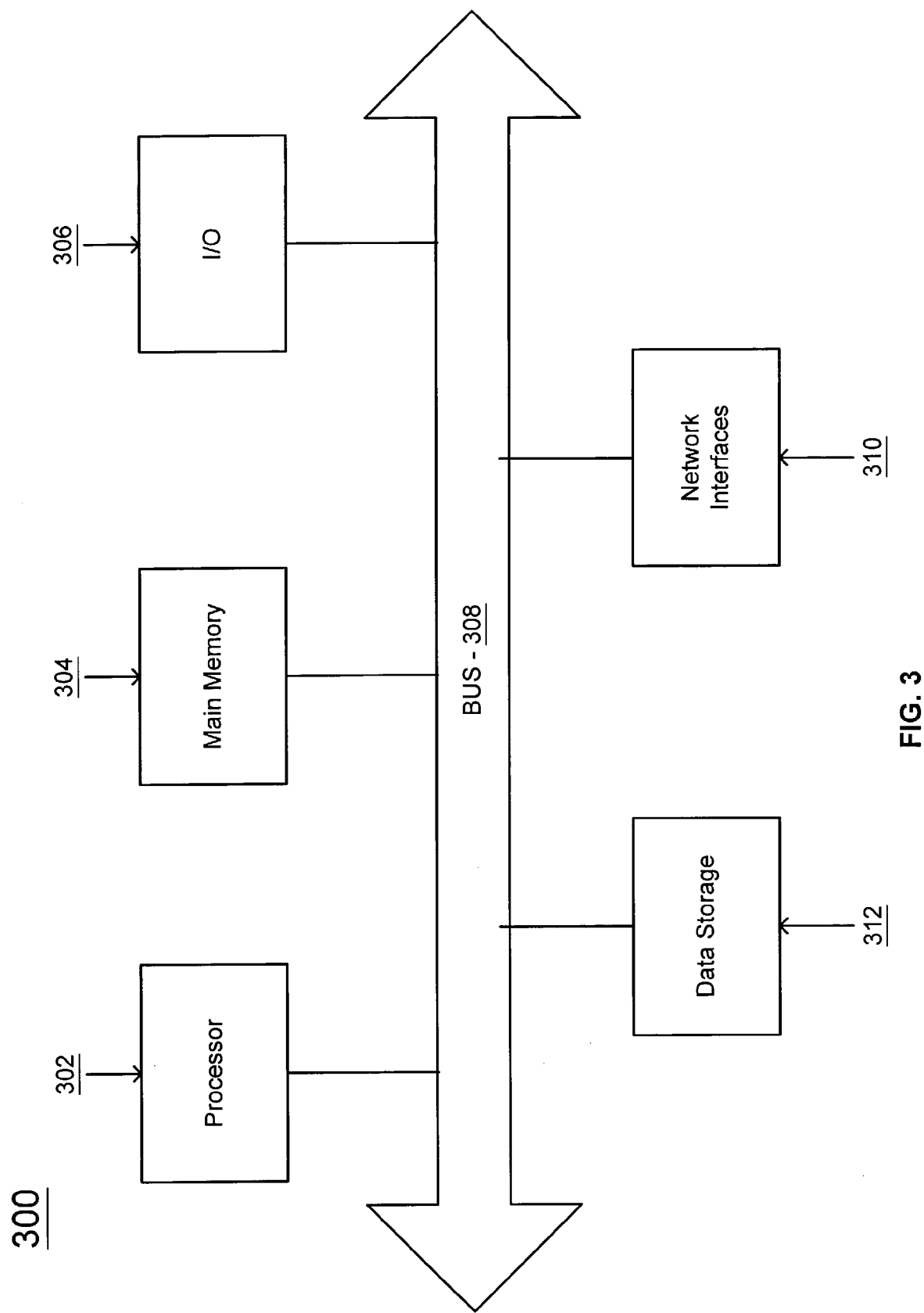
FIG. 3 is a block diagram illustrating a suitable computing environment in which certain aspects of the illustrated invention may be practiced.

FIG. 3 is a block diagram illustrating a suitable computing environment in which certain aspects of the invention may be practiced. A computer system 300 has components 302–314, including a processor 302, a memory 304, an Input/Output device 306, a data storage 312, a network interface 310, and a display device 314, coupled to each other via a bus 308. In one embodiment, memory 304 may include a dynamic random access memory device (DRAM). The components perform their conventional functions known in the art and provide means for implementing the system 100. Collectively, these components represent a broad category of hardware systems, including but not limited to general purpose computer systems and specialized packet forwarding devices. It is to be appreciated that various components of computer system 300 may be rearranged, and that certain implementations of embodiments of the invention may not require nor include all of the above components. Furthermore, additional components may be included in system 300, such as additional processors (e.g., a digital signal processor), storage devices, memories, and network or communication interfaces.

As will be appreciated by those skilled in the art, the content for implementing an embodiment of the method of the invention, for example, computer program instructions, may be provided by any machine-readable media which can store data that is accessible by system 100, as part of or in addition to memory, including but not limited to cartridges, magnetic cassettes, flash memory cards, digital video disks, random access memories (RAMs), read-only memories (ROMs), and the like. In this regard, the system 100 is equipped to communicate with such machine-readable media in a manner well-known in the art.

It will be further appreciated by those skilled in the art that the content for implementing an embodiment of the method of the invention may be provided to the system 100 from any external device capable of storing the content and communicating the content to the system 100. For example, in one embodiment of the invention, the system 100 may be connected to a network, and the content may be stored on any device in the network.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   reading configuration records from an electrically erasable programmable read-only memory (EEPROM) coupled to an application specific integrated circuit (ASIC) during an initialization phase upon system reset;
   writing data to target registers from an EEPROM via a bus of the ASIC to initialize the registers during the initialization phase, wherein the data and target registers are specified in the configuration records; and
   restricting a processor external to the ASIC to have read only access to the target registers during the initialization phase.

2. The method of claim 1, wherein translating the records to register write requests comprises translating the records to register write requests at the EEPROM controller in the ASIC.

3. The method of claim 2 further comprising allowing the EEPROM controller to have write access to the target registers during the initialization phase.

4. The method of claim 3, wherein allowing the EEPROM controller to have write access to a target register while allowing the processor to have read only access to the target register comprises including one or more values in the write requests originating from the EEPROM controller that allow a bus master to differentiate EEPROM write requests to the target register from write requests originating from the processor.

5. The method of claim 1, further comprising blocking the processor from accessing the bus until the target registers have been initialized.

6. The method of claim 1, wherein reading configuration records from the EEPROM comprises reading a record header including information about a command.

7. The method of claim 6, wherein translating the records to write requests comprises translating the records to write requests if the command is a write command.

8. The method of claim 6, wherein reading configuration records from the EEPROM comprises reading configuration records from the EEPROM sequentially while the command is a write command.

9. The method of claim 6, wherein reading configuration records from the EEPROM comprises jumping to a specified address to read the next configuration record when the command is a jump command.

10. An apparatus comprising:
    an application specific integrated circuit (ASIC) including a plurality of configuration registers; and
    an electrically erasable programmable read-only memory (EEPROM) coupled to the ASIC to initialize the configuration registers of the ASIC upon system reset via stored configuration records, the ASIC to allow read only access to external devices during initialization of the configuration registers.

11. The apparatus of claim 10, wherein the ASIC further comprises an EEPROM controller coupled to the EEPROM to read the configuration records of the EEPROM upon system reset.

12. The apparatus of claim 10, wherein the ASIC further comprises a bus controller coupled to an EEPROM controller to control activity on a bus and wherein the registers are initialized via the bus.

13. The apparatus of claim 10, wherein the configuration records include addresses of the registers to be initialized and data to be written to the registers during initialization.

14. An article of manufacture comprising:
a machine accessible medium including content that when accessed by a machine causes the machine to:
read configuration records from an electrically erasable programmable read-only memory (EEPROM) coupled to an application specific integrated circuit (ASIC) during initialization upon system reset;
allow a processor external to the ASIC to have read only access to a target register during the initialization;
write data to target registers by an EEPROM controller via a bus of the ASIC to initialize the registers during the initialization, wherein the data and target registers are specified in the configuration records.

15. The article of manufacture of claim 14, wherein the machine-accessible medium further includes content that causes the machine to block the processor from accessing the bus until the target registers have been initialized.

16. The article of manufacture of claim 14, wherein the machine accessible medium including content that when accessed by the machine causes the machine to read configuration records from the EEPROM comprises the machine accessible medium including content that when accessed by the machine causes the machine to read a record header including information about a command.

17. The article of manufacture of claim 16, wherein the machine accessible medium including content that when accessed by the machine causes the machine to translate the records to write requests comprises the machine accessible medium including content that when accessed by the machine causes the machine to translate the records to write requests if the command is a write command.

18. The article of manufacture of claim 16, wherein the machine accessible medium including content that when accessed by the machine causes the machine to read configuration records from the EEPROM comprises the machine accessible medium including content that when accessed by the machine causes the machine to read configuration records from the EEPROM sequentially while the command is a write command.

19. The article of manufacture of claim 16, wherein the machine accessible medium including content that when accessed by the machine causes the machine to read configuration records from the EEPROM comprises the machine accessible medium including content that when accessed by the machine causes the machine to jump to a specified address to read the next configuration record when the command is a jump command.

20. A system comprising:
a processor;
an electrically erasable programmable read-only memory (EEPROM) to initialize configuration registers during initialization upon system reset via stored configuration records comprising a record header;
a dynamic random access memory (DRAM); and
an application specific integrated circuit (ASIC) coupled to the EEPROM, the processor and to the DRAM, the ASIC including:
a plurality of configuration registers to be initialized upon system reset;
an EEPROM controller coupled to the EEPROM to read the configuration records from the EEPROM and translate the records to register write requests; and
a bus controller to control access to the configuration registers, the processor having read only access to the configuration registers during the initialization and the EEPROM controller having read and write access during the initialization.

* * * * *